June 18, 1935. C. E. CARPENTER 2,005,178
DOUGHNUT MACHINE AND THE LIKE
Filed Oct. 9, 1934
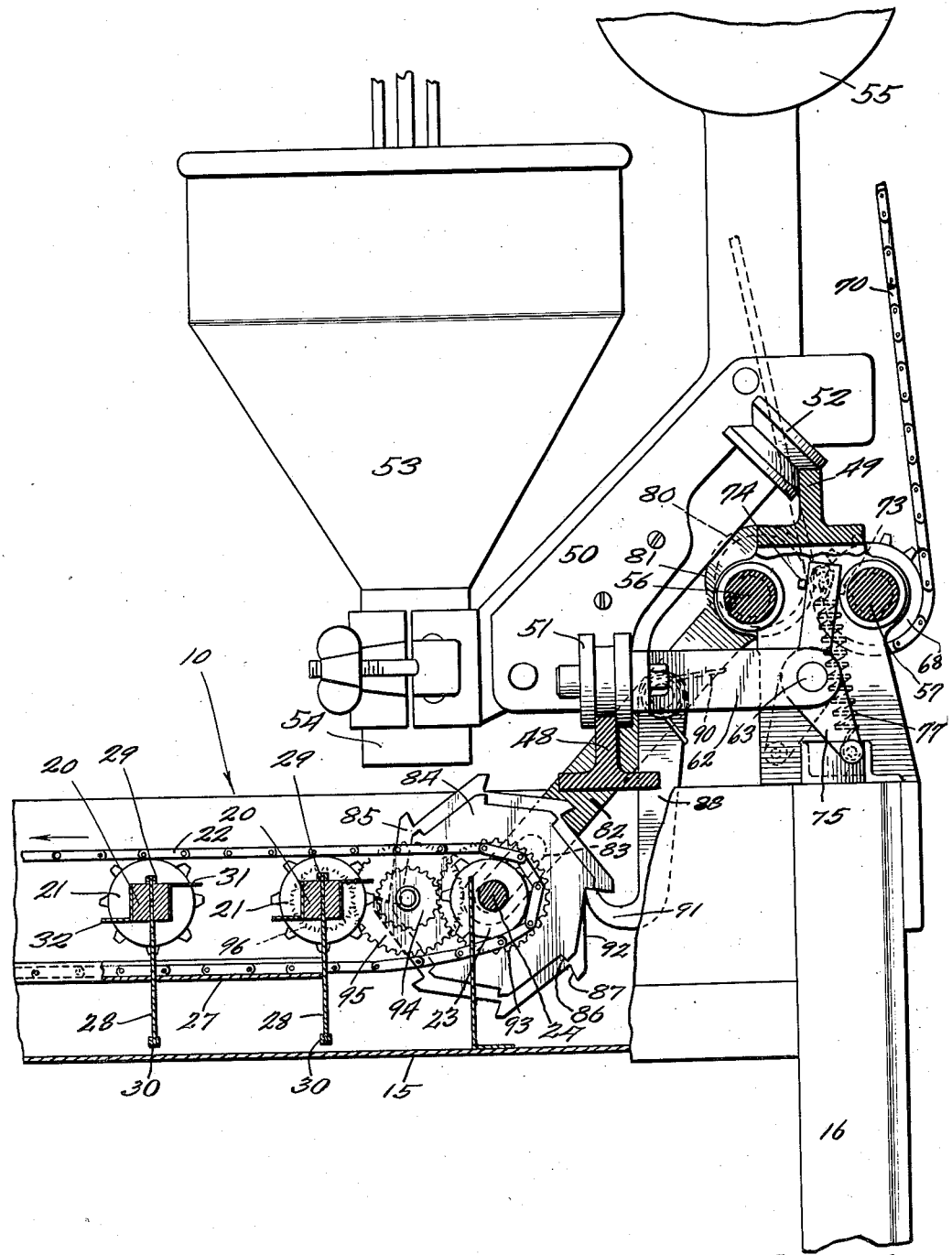
Inventor:
Charles E. Carpenter Patented June 18, 1935

2,005,178

UNITED STATES PATENT OFFICE 2,005,178

DOUGHNUT MACHINE AND THE LIKE

Charles E. Carpenter, Chicago, Ill.

Application October 9, 1934, Serial No. 747,653

9 Claims. (Cl. 53—7)

This invention has to do with improvements in doughnut machines and the like. The features of invention herein disclosed have reference particularly to improvements in turn-over or turning mechanism and advancing mechanism for treating the doughnuts in the frying pan. In this connection, the construction of the device is such that the advancing of the doughnuts through the frying pan from the point where they are introduced to the delivery end where they are delivered is accomplished by turning and forwardly advancing the doughnuts from point to point without the necessity of the turning mechanism itself accomplishing any bodily forward movement. That is to say, the construction is such that the turn-over devices do not themselves necessarily advance bodily through the frying pan, and thus said devices do not constitute necessarily a physically advancing conveyor.

Another feature of the invention relates to the provision of an arrangement such that the frying doughnuts are turned over in the pan with a more or less continuous operation, the doughnuts being thus consecutively fried on their two sides with a large number of frying operations of short duration. This is to be clearly distinguished from an operation in which the doughnuts are practically completely fried on one side and are turned over and completely fried on the other side.

In connection with the foregoing, it is a further object to provide a mechanism which will cause the doughnuts to be at times held in the hot frying grease at an angle with respect to the horizontal so that they are presented at such times to the grease in an angular fashion. In other words, during this interval the doughnuts are presented in the frying grease at an angle which is a varying angle with respect to the surface of the grease itself.

Another feature of the invention relates to the provision of a very simple form of turning and advancing mechanism and which can be cheaply constructed from simple parts. Also to provide a mechanism in which the turning of the doughnuts is effected within a very small space and within a relatively thin layer of liquid grease in the frying pan.

Other objects and uses of the invention will appear from the detailed description of the same, which consists in the features of construction and combinations of parts hereinafter described and claimed.

In the drawing, the figure shows a typical construction of device embodying the features of the present invention.

In this drawing, the frying pan is designated generally by the numeral 10. The figure also shows a suitable dough hopper 53 and a suitable doughnut forming device 54 located above the frying pan 10; the dough hopper and doughnut forming device being carried by a carriage which is adapted to travel back and forth over the end portion of the frying pan, being for this purpose supported on cross rails 48 and 49. The carriage for the dough hopper is provided with suitable rollers 51 and 52 which travel on said rails so that the carriage may be readily moved back and forth by suitable mechanism, the details of construction of which are not explained in this application, since the same do not constitute any part of the present invention. In this connection, this application is a continuation in part of my application Serial No. 569,376, which was filed October 17, 1931.

Located and extending across one end of the frying pan 10 there is a shaft 24 which carries suitable ratchet wheels 84 and 85 which may be driven in a suitable manner so as to rotate said shaft. The shaft also carries a sprocket wheel 23 having the chain 22 which extends lengthwise of the frying pan, and said chain also passes over a suitable sprocket at the other end of the frying pan. When the shaft 24 is periodically rotated in a counterclockwise direction the chain is also caused to travel with its upper flight moving in the left-hand direction, as shown by the arrow in Fig. 4.

The details of construction of the mechanism for advancing the shaft 24 are not explained in this application for the reason that the same constitutes a continuation in part of my aforesaid earlier application.

Extending across the frying pan there is a series of shafts 20. Each of these shafts carries a sprocket 21, and the upper flight of the chain 22 engages the top faces of the sprockets 21 so that as the chain is periodically advancing in the manner already explained the shafts 20 are given periodical semi-rotations in a counterclockwise direction.

Each of the shafts 20 is slotted to receive a blade or paddle 28, which paddle is of a width such that it does not interefere with the adjacent shaft when said paddle is rotated in the extended position shown in the figure. Furthermore, each of the paddles 28 is provided with enlargements or beads 29 and 30 on its opposite edges. The result is that when the shafts 20 are arrested with their slots standing vertical the paddles all hang down in the manner shown in the figure, being prevented from slipping out of the slots by reason of the enlargements on the edges of the paddles. Then as the shafts are rotated in the counterclockwise direction the paddles are swung up and receive the doughnuts on their upper faces and raise said doughnuts with an angular movement with respect to the surface of the grease in which said doughnuts are lying. The reason is that with the periodical semi-rotations of the shafts the paddles rise up beneath the doughnuts floating on the hot grease between the shaft positions; and as this operation continues the doughnuts are picked up with an angular movement with respect to the surface of the grease, and they are raised with a continuing angular movement until finally the paddles and doughnuts reach a substantially vertical position at the completion of the semi-rotation of the shafts. When this takes place the doughnuts will fall forward and be allowed to drop down in turned-over condition onto the molten grease at positions in advance of the positions previously occupied by the doughnuts, whereby the doughnuts are periodically advanced and turned over into advanced positions, the operation being effected with a varying angular position of the doughnuts in the grease during at least a portion of their movement.

The depth of the grease in the frying pan should be sufficient to accommodate the paddles when hanging down vertically.

As the shafts approach the completion of their semi-rotations in the counterclockwise direction they will slip down again until arrested by the beads or enlargements at the opposite edges of the paddles, so that each turning and advancing movement of the doughnuts takes place with a semi-rotation of the shafts and paddles and without a physical advancement of the shafts themselves lengthwise of the pan.

If desired, there may also be provided on the shafts 20 the shelves 31 and 32, which extend outwardly from said shafts a short distance. These shelves are at right angles to the planes of the paddles themselves, so that during the turning operations (when said shelves 31 and 32 are provided), the doughnuts are prevented from slipping off of the paddles before the semi-rotations have been completed. By this arrangement there is assurance that each doughnut will be carried with the paddle until the semi-rotation is substantially completed, whereupon said doughnut will tilt forward and drop down onto the surface of the grease in the advanced position and in turned-over condition.

I wish to emphasize the fact that the turning and advancing mechanism herein disclosed serves not only to turn and advance the doughnuts periodically through the frying pan, but also accomplishes this result by an operation in which each doughnut is for a time supported in the frying grease at an angle other than the horizontal.

While I have herein shown and described only a single embodiment of the features of my present invention, still I do not intend to limit myself thereto except as I may do so in the claims.

I claim:

1. In a machine of the class described, the combination of a frying pan, means for forming and depositing doughnuts in one end of said frying pan, and means for turning and advancing said doughnuts lengthwise of the pan, said means comprising a series of transversely extending longitudinally slotted shafts, a radial paddle member located in the slot of each of said shafts, and rotating with the shaft, an enlargement on each longitudinal edge of said paddle, said enlargements being of greater width than the shaft slots, to thereby retain the paddles against slippage out of the slots, and means for simultaneously rotating all of the shafts periodically through semi-revolutions to thereby carry the respective blades upwards and over away from the point of doughnut introduction and towards the point of doughnut delivery, substantially as described.

2. In a machine of the class described, the combination of a frying pan, means for forming and introducing doughnuts into one end of said pan, a series of transversely extending shafts located across the pan, each of said shafts being longitudinally slotted, a turn-over paddle located in the slot of each of said shafts, means for preventing disengagement of the paddles from the respective shaft slots while permitting movement of the paddles radially in said slots, and means for simultaneously turning all of the shafts a semi-revolution to thereby swing all of the paddles upwardly and over away from the point of introduction of the doughnuts and towards the discharge end of the device, substantially as described.

3. In a machine of the class described, the combination of a frying pan, means for forming and introducing doughnuts into one end of said pan, a series of transverse shafts extending across the pan, a paddle carried by each of said shafts and movable radially with respect to such shaft, means limiting the amount of such radial movement to thereby prevent disengagement of the paddles from the respective shafts, and means for simultaneously rotating all of the shafts through a semi-revolution to thereby swing the paddles up and over from the point of doughnut introduction towards the discharge end of the machine, substantially as described.

4. In a machine of the class described, the combination of a frying pan, means for introducing doughnuts into one end thereof, a series of transverse paddles located within the pan and mounted for rotation on fixed axes while permitting movement of the paddles radially with respect to said axes, means for turning all of the paddles up and over from the point of introduction towards the discharge end of the machine, means for delivering the completed articles from the discharge end of the machine, substantially as described.

5. In a machine of the class described, the combination of a frying pan, means for introducing doughnuts into one end thereof, a series of transverse paddles located within the pan and mounted for rotation on fixed axes while permitting movement of the paddles radially with respect to said axes, means for turning all of the paddles up and over from the point of introduction towards the discharge end of the machine, substantially as described.

6. In a machine of the class described, the combination of a frying pan, means for forming and introducing doughnuts into one end of the said pan, and means for simultaneously turning doughnuts and advancing them lengthwise in the pan, comprising a series of radially retractable paddles extending across the pan, each paddle receiving doughnuts at one side and delivering them at the other side of the position of such paddle and means for raising each paddle and swinging it over to the delivery side, each paddle being radially extended in form during movement from its receiving to its delivering side, and being radially retracted in form during movement from its delivering to its receiving side, substantially as described.

7. In a machine of the class described, the combination of a frying pan and means for turning and advancing doughnuts therein comprising a horizontal shaft, provided with a longitudinally extending slot, a paddle slidably located in said slot, means for limiting the sliding movement of the paddle in either direction, and means for turning the shaft through a semi-revolution to thereby swing the paddle upwards and over from the point of introduction towards the point of delivery, substantially as described.

8. In a machine of the class described, the combination of a frying pan, and means for turning over doughnuts and advancing them lengthwise of the pan comprising a paddle, means for supporting said paddle to permit axial rotation of the paddle broad-face-on while permitting edgewise movement of the paddle radially, means for limiting such edgewise movement in either direction, and means for turning the device through a semi-revolution, substantially as described.

9. In a machine of the class described, the combination of a frying pan, and means for turning over doughnuts and advancing them lengthwise of the pan comprising a paddle, means for supporting said paddle to permit axial rotation of the paddle broad-face-on while permitting edgewise movement of the paddle radially, and means for turning the device through a semi-revolution, substantially as described.

CHARLES E. CARPENTER.